(12) United States Patent
Patel et al.

(10) Patent No.: US 8,595,158 B2
(45) Date of Patent: Nov. 26, 2013

(54) SYSTEM AND METHOD FOR MAPPING SS7 BEARER CHANNELS

(75) Inventors: Jayesh Patel, Tyngsboro, MA (US);
John C. Apostle, Lowell, MA (US);
Richard K. Seiffert, Wilmington, MA (US)

(73) Assignee: Triasys Technologies Corporation, Billerica, MA (US)

( * ) Notice: Subject to any disclaimer, the term of this patent is extended or adjusted under 35 U.S.C. 154(b) by 329 days.

(21) Appl. No.: 13/157,833

(22) Filed: Jun. 10, 2011

(65) Prior Publication Data

US 2012/0005133 A1 Jan. 5, 2012

Related U.S. Application Data

(60) Provisional application No. 61/353,973, filed on Jun. 11, 2010.

(51) Int. Cl.
*G06F 15/18* (2006.01)

(52) U.S. Cl.
USPC ............................................ 706/12; 370/255

(58) Field of Classification Search
None
See application file for complete search history.

(56) References Cited

U.S. PATENT DOCUMENTS

| 6,373,817 B1* | 4/2002 | Kung et al. ................. 370/217 |
| 6,721,284 B1* | 4/2004 | Mottishaw et al. ........... 370/255 |
| 7,054,325 B1* | 5/2006 | Archibald .................... 370/410 |
| 2006/0168303 A1* | 7/2006 | Oyama et al. ................ 709/231 |
| 2006/0229090 A1* | 10/2006 | LaDue ......................... 455/507 |
| 2007/0115835 A1 | 5/2007 | Renfrew et al. |
| 2007/0127436 A1* | 6/2007 | Karimi-Cherkandi et al. ............................. 370/352 |
| 2007/0165554 A1* | 7/2007 | Jefferson et al. ............. 370/315 |
| 2007/0183403 A1* | 8/2007 | Somers ........................ 370/352 |
| 2008/0025295 A1 | 1/2008 | Elliott et al. |
| 2009/0109959 A1 | 4/2009 | Elliott et al. |

OTHER PUBLICATIONS

Choi, B.D.; Choi, S. H.; Park, C.G.; Sung, D.K., "Analysis of a leaky bucket control scheme in the signalling system No. 7 network," Communications, IEE Proceedings-, vol. 145, No. 1, pp. 25,32, Feb. 1998.*

* cited by examiner

*Primary Examiner* — Jeffrey A Gaffin
*Assistant Examiner* — David H Kim
(74) *Attorney, Agent, or Firm* — Peter A. Nieves; Sheehan Phinney Bass + Green PA

(57) ABSTRACT

A system and method for associating Signaling System 7 logical circuits and bearer channels are presented. The system may include an event detector configured to receive an SS7 signaling message on an SS7 signaling link, parse a logical circuit from the SS7 signaling message, receive an SS7 bearer channel, and detect a bearer channel event on the SS7 bearer channel. A statistical learning model block is configured to calculate a correlation confidence value between said bearer channel and said logical circuit. The method may include parsing a logical circuit ID from a signaling message on an SS7 signal link, identifying a bearer channel associated with a bearer event on a bearer circuit, and calculating a current correlation confidence value between the logical circuit ID and the bearer channel.

24 Claims, 6 Drawing Sheets

SYSTEM AND METHOD FOR MAPPING SS7 BEARER CHANNELS

CROSS-REFERENCE TO RELATED APPLICATIONS

This application claims the benefit of U.S. Provisional Patent Application Ser. No. 61/353,973, filed Jun. 11, 2010, entitled "SYSTEM AND METHOD FOR MAPPING SS7 BEARER CHANNELS," which is incorporated by reference herein in its entirety.

FIELD OF THE INVENTION

The present invention relates to telecommunication networks, and more particularly, is related to Signaling System 7 networks.

BACKGROUND

Signaling in telecommunication networks can be categorized into two classes: in-band signaling; and, out of band signaling. In-band signaling is also known as channel associated signaling (CAS). In this class, signaling messages are sent on the same physical channel that carries bearer traffic. Signaling System R1, Signaling System R2 and Signaling System C5 are examples of in-band signaling.

Out-of-band signaling is also known as common channel signaling (CCS). In this class, signaling messages are sent on a separate physical channel from the bearer traffic. CCS uses a common link to carry signaling information for a number of bearer channels or trunks. This form of signaling is cheaper, has faster connect times, and is more flexible than CAS. The two main signaling systems in this category are Signaling System 7 (SS7) and Primary Rate Interface (PRI). The SS7 network acts as a backbone for the Public Switched Telephone Network (PSTN) as it allows for efficient call setup and teardown. The SS7 network interconnects thousands of service providers under one common signaling network. SS7 networks are also used to interconnect cellular Mobile Switching Centers (MSCs).

An SS7 network contains Signaling End Points (SEP) that send and receive SS7 messages and signaling links. There are three kinds of signaling end points: a Service Switching Point (SSP) or Central Office Switch, a Signal Transfer Point (STP) and a Service Control Point (SCP). An SSP is a voice switch that processes and switches voice-band traffic. An STP is responsible for transferring SS7 messages between SSPs or between SSPs and SCPs. An SCP acts as an interface between a telecommunication database and the SS7 networks. Each signaling end point in an SS7 network is identified by a unique numeric point code. All SS7 messages transmitted on the SS7 network carry origination point codes (OPC) and destination point codes (DPC) for routing purposes.

ISDN User Part (ISUP) and Telephone User Part (TUP) are protocols residing at Level 4 of the SS7 stack. ISUP includes signaling messages and procedures for controlling inter-exchange calls between two analog subscribers, two ISDN users, and an ISDN user and an analog subscriber. TUP, a predecessor of ISUP, provides similar functions but only between two analog subscribers. The separation of signaling and bearer channels creates the need for associating two entities. ISUP and TUP use 16-bit circuit identification code (CIC) to identify each bearer channel. When ISUP messages related to bearer channel signaling are sent between two switches, they always include the pertaining CIC. Since bearer channels are bi-directional, each end of the switch must associate the same CIC with the same physical bearer channel. A service provider controls the association pairing a CIC with an individual bearer channel. The service provider assigns a CIC value to an individual bearer channel during network planning and provisioning according to applicable predetermined rules. There is no standard procedure that is followed for CIC association. However, the association must be unique for each DPC. A CIC value can be used again within the same SSP as long as it is not duplicated for the same DPC.

Technical specifications for SS7 are published by the International Telecommunication Union (ITU). Specific documents related to this disclosure include:

ITU Q.35 Technical characteristics of tones for the telephone service,

ITU Q.761 Signaling system No. 7—ISDN user part functional description,

ITU Q.762 Signaling System No. 7—ISDN User Part general functions of messages and signals, ITU Q.763 Signaling System No. 7—ISDN user part formats and codes, ITU Q.764 Signaling System No. 7—ISDN user part signaling procedures, ITU Q.784.1 ISUP Basic Call Test Specification, ITU Q.723 TUP—Formats and codes, and ITU Q.724 TUP—Signaling procedures.

A third party monitoring an SS7 link may not know in advance which channels within a link contain signaling links, and which channels contain bearer channels. Further, the third party may not know in advance the mapping used to associate individual signaling messages on a signal link with specific bearer channels. As discussed above, ISUP and TUP messages contain a CIC code. Each CIC code is statically mapped to a bearer channel or time slot on a specific link. Once the third party has identified a pairing between a CIC with a bearer channel, the third party can associate signaling messages over the signaling link with activity on the paired bearer channel. Therefore, there is a need by a third party monitoring traffic on an SS7 link to associate CIC codes with bearer channels.

SUMMARY OF THE INVENTION

Embodiments of the present invention provide a system and method for mapping SS7 bearer channels. Briefly described, a first aspect of the present invention is directed to a system including an event detector configured to receive an SS7 signaling message on an SS7 signaling link, parse a logical circuit from the SS7 signaling message, receive an SS7 bearer channel, and detect a bearer channel event on the SS7 bearer channel. The system further includes a statistical learning model block configured to calculate a correlation confidence value between the bearer channel and the logical circuit.

Under a first embodiment of the system under the first aspect, the event detector may be further configured to assign a signaling tag to the signaling event. The signaling tag may include a signaling event ID, a logical circuit ID, and a time stamp. The event detector may also be configured to assign a bearer tag to a bearer channel event. The bearer tag may include a bearer channel event ID and a time stamp.

Under a second embodiment of the system under the first aspect, the system includes a demultiplexer configured to extract the SS7 signaling link from a data stream, and to extract the SS7 bearer channel from the data stream.

Under a third embodiment of the system under the first aspect, the system includes a mapping control block. The mapping control block may be configured to lock a pairing between a bearer channel and a logical circuit, instruct the demultiplexer not to extract the bearer channel, instruct the event detector to ignore any signaling events associated with the logical circuit, instruct the statistical learning model block not to process any bearer tag associated with the bearer channel, and instruct the statistical learning model block not to process any signaling tag associated with the logical circuit.

A second aspect of the present invention is directed to a method for associating an SS7 logical signaling circuit with an SS7 bearer channel. Briefly described, the method includes the steps of parsing a logical circuit ID from a signaling message on an SS7 signal link, identifying a bearer channel associated with a bearer event on a bearer circuit; and calculating a current correlation confidence value between the logical circuit ID and the bearer channel. The method may further include the step of associating the bearer channel with the logical circuit ID.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 1A is a simplified depiction of the communication network and FIG. 1B is a more detailed depiction of the communication network.

DETAILED DESCRIPTION

Figure 1A:
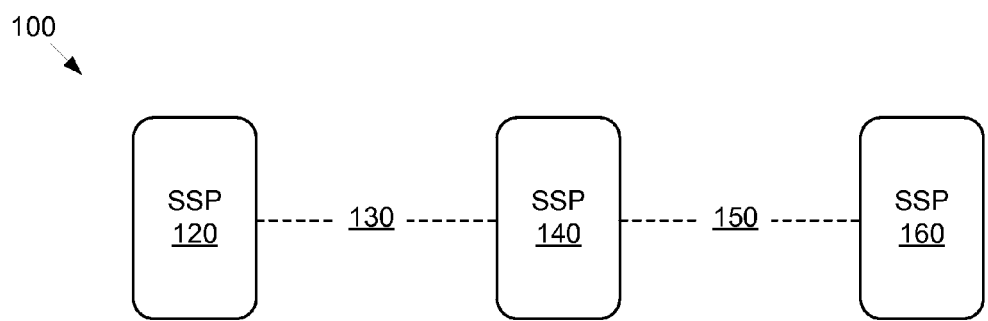
FIG. 1A and FIG. 1B are diagrams depicting an embodiment of a communication network where

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention provide a system and method for mapping SS7 bearing channels within a trunk by correlating traffic transitions on bearer channels with events on a signaling link. The system accumulates information correlating circuit identifiers in signaling messages with bearer channels over time. The system may declare a bearer channel circuit mapping when the correlation data converges.

FIG. 1 shows a first embodiment of a communication network 100. In a first view of this embodiment, as shown in FIG. 1A, the communication network 100 has three nodes: a first SSP 120, a second SSP 140 and a third SSP 160. The first SSP 120 and the second SSP 140 are connected by a first telecommunication link 130. Similarly, the second SSP 140 and the third SSP 160 are connected by a second telecommunication link 150. The first telecommunication link 130 and second telecommunication link 150 may use one of several types of telecommunication protocols. In the first embodiment, the telecommunication links 130 and 150 use time division multiplexed communication protocols for transmission of data. For instance, first telecommunication link 130 and second telecommunication link 150 may each be a T1 link or an E1 link. It should be noted, however, there is no objection to the telecommunication channels being carried in other channelized formats, for example, frequency division multiplexing or statistical multiplexing.

Figure 1B:
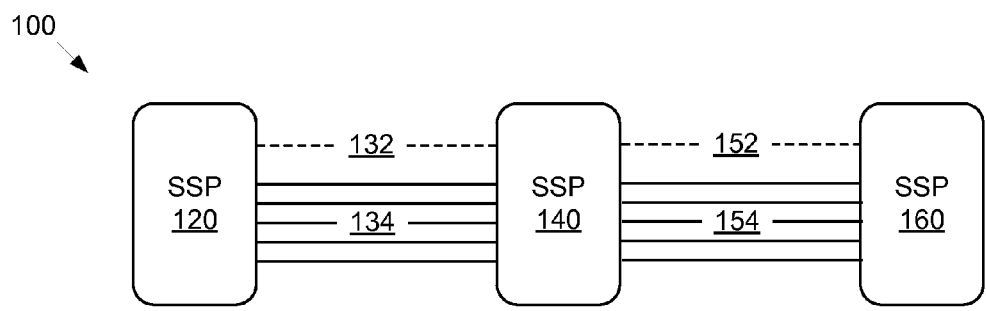

FIG. 1B is a second view of the communication network 100 depicting an expanded detail of the first telecommunication link 130 and the second telecommunication link 150. The first telecommunication link 130 is represented by first signaling links 132 and first bearer channels 134, where the first signaling links 132 are illustrated as dashed lines and the first bearer channels 134 are illustrated as solid lines. In addition, the second telecommunication link 150 is represented by second signaling links 152 and second bearer channels 154, where the second signaling links 152 are illustrated as dashed lines and the second bearer channels 154 are illustrated as solid lines. The first signaling links 132 may carry common channel signaling messages for the first bearer channels 134, and the second signaling links 152 may carry common channel signaling messages for the second bearer channels 154. Further, each signaling link and each bearer channel may be carried on a different time slot within the link. For instance, each signaling link 132 may be carried on a separate DS0 within the telecommunication link 130 (FIG. 1A), and each of the bearer channels 134 may similarly be carried on individual DS0s within the telecommunication link 130 (FIG. 1A). It should be noted that while FIG. 1B depicts signaling links originating and terminating at the same nodes as the bearer traffic, known as Associated Signaling Mode, there is no objection to the signaling links traversing different nodes from the bearer traffic, known as Quasi-Associated Signaling Mode.

Figure 2A:
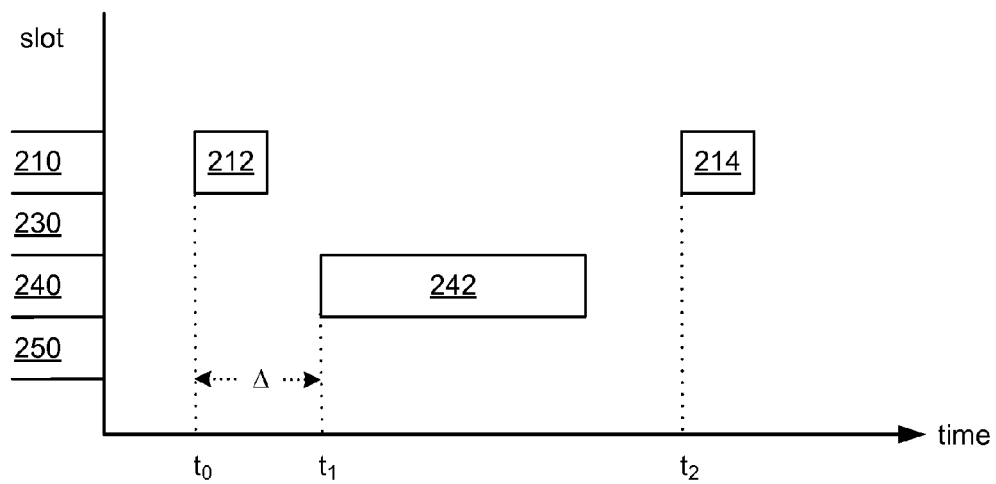
FIG. 2A and FIG. 2B are timing diagrams of examples of the timing relationship between signaling messages and bearer channel events.
Figure 2B:
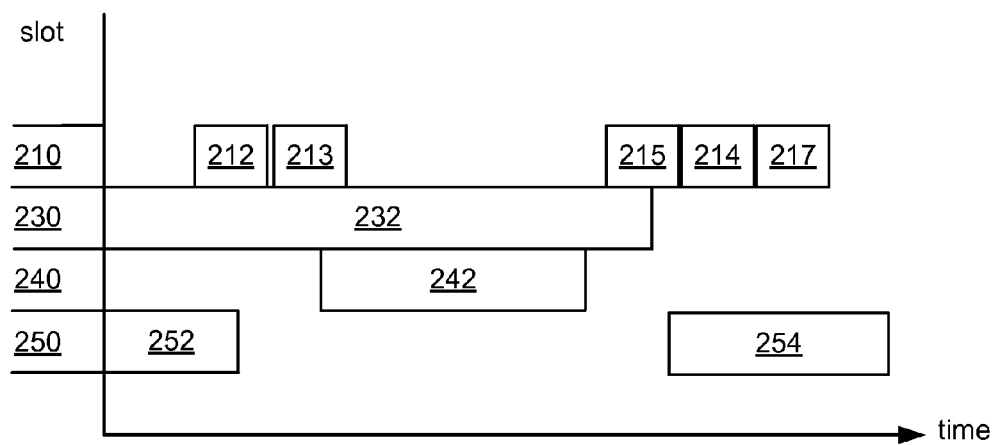

FIGS. 2A and 2B are diagrams depicting the timing of messages carried between two nodes in the first embodiment, for example, the first SSP 120 (FIG. 1) and the second SSP 140 (FIG. 1). FIG. 2A is a first example of the timing of two signaling messages 212 and 214, which are transmitted on a first time slot 210, which in this example is a signaling link 210, relative to the timing of a first bearer message 242 on a first bearer channel 240. In the first example, the first signaling message 212, occurring at time $t_0$, indicates the onset of activity on a third time slot 240, which in this example is a bearer channel 240. For example, the first signaling message 212 may be an Address Complete Message (ACM) indicating that all address signals have been received and that call set-up on the bearer channel 240 is progressing. In this example, the first signaling message 212 is followed by the first bearer message 242, occurring at time $t_1$, which may be a Ring-back Tone (RBT). Thereafter, the second signaling message 214 is transmitted at time $t_2$. The second signaling message 214 may be, for example, an Answer Message (ANS). Because, in the first example, there is only traffic on one bearer channel 240 present in the proximity of the time when signaling messages 212 and 214 occur, a third party monitoring these messages could logically associate the signaling messages 212 and 214 with the first bearer message 242. This is, in part, because the first bearer message 242 occurred at $t_1$, a short time after the first signaling message 212 occurred at $t_0$, and because there were no other bearer messages occurring during that time interval. However, such associations may not be as readily apparent when there is additional traffic present.

FIG. 2B shows a second example of the timing of the signaling messages 212 and 214 depicted in FIG. 2A, overlaid with additional signaling messages 213, 215 and 217 on signaling link 210. FIG. 2B also shows a second bearer channel on a second time slot 230, carrying a second bearer channel message 232, and a third bearer channel on a fourth time slot 250, carrying third bearer channel messages 252 and 254. In this second example, a third party monitor may be unable to readily ascertain which, if any, of signaling messages 212, 213, 214, 215 and 217 are associated with the first bearer channel message 242. In general, association of signaling messages with changes in bearer channel activity becomes more difficult as call activity on the links increases.

Figure 3:
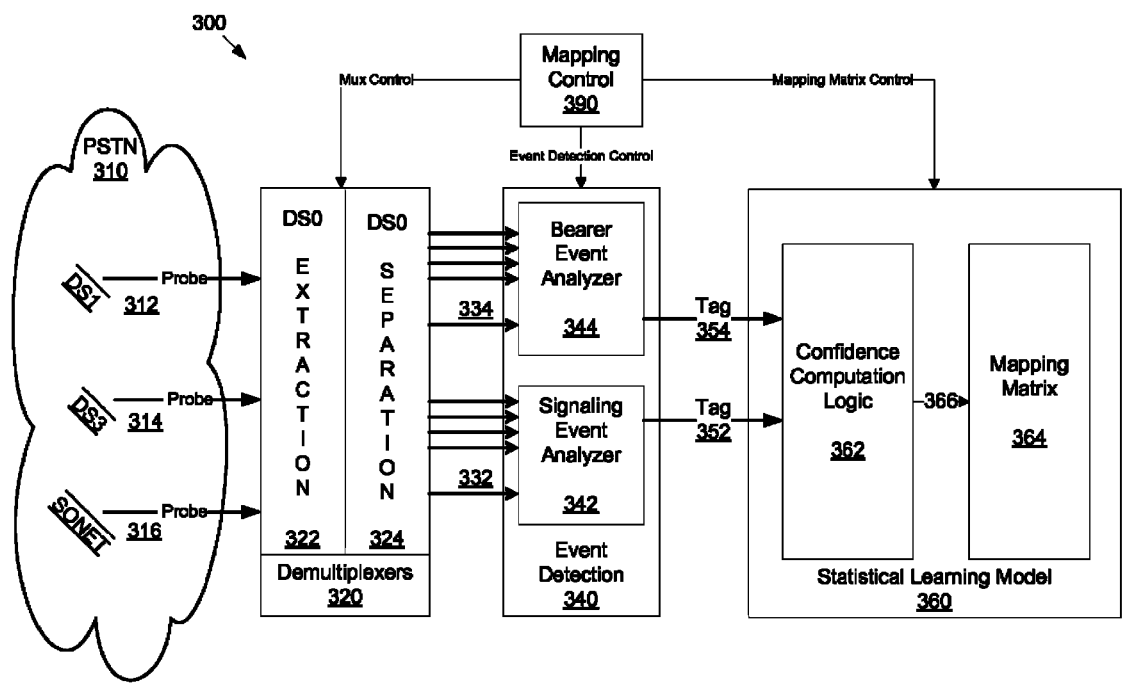
FIG. 3 is a schematic diagram of an exemplary embodiment of a system for mapping bearer channels in a public switched telephone network.

FIG. 3 is a diagram of a second embodiment of a system 300 for mapping bearer channels over multiple links in a public switched telephone network (PSTN) 310. The PSTN may contain SS7 links carried over a variety of protocols. FIG. 3 depicts probes at three levels of an exemplary network hierarchy: a first level, SONET; a second level, DS3; and a third level, DS1. In an alternative embodiment (not shown), the network hierarchy may use European protocols SDH, E3, and E1, or other protocols. In this embodiment, SS7 signals are collected by a SONET probe 316, a DS3 probe 314, and a DS1 probe 312. The probes 312, 314, 316 pass network traffic to a demultiplexer block 320. The demultiplexer block 320 contains DS0 extraction block 322 and DS0 separation block 324. In this embodiment, the DS0 extraction block 322 extracts each DS0 carrying an SS7 signaling link or bearer channel from a parent higher level digital hierarchy interface. The DS0 extraction block 322 tags each DS0 with an interface number and time slot number corresponding to the location of the DS0 within the parent protocol. The DS0 separation block 324 then scans each DS0 for the presence of SS7 Message Transfer Part Level 2 (MTP2) messages to separate signaling links 332 from bearer channels 334. The DS0 separation block 324 identifies signaling links 332 by the presence of MTP2 messages, and the DS0 separation block 324 identifies bearer channels 334 by the absence of such MTP2 messages. The demultiplexer block 320 then forwards the tagged DS0s to the event detection block 340. In particular, the DS0 separation block 324 forwards bearer channels 334 to bearer event analyzer block 344, and the DS0 separation block 324 forwards signaling links 332 to a signaling event analyzer block 342. The signaling event analyzer block 342 examines each of the signaling links 332 for signaling events, as described below. The bearer event analyzer block 344 examines each of the bearer channels 334 for several bearer events, as described below.

Signaling Event Analyzer Block

The signaling event analyzer block 342 further processes signaling links 332. The signaling event analyzer block 342 locates a protocol indicator field in an SS7 MTP3 header and parses ISUP or TUP messages for call control messages and maintenance messages.

Call control messages are used for setup and release of a call, and are defined in ITU Q.762 and ITU Q.723. Table 1 displays an exemplary list of call control messages that the signaling event analyzer block 342 may identify. In alternative embodiments, the signaling event analyzer block 342 may identify a different set of call control messages.

TABLE 1

Signaling Events - Call Control

| ID | Signaling Message ISUP | Signaling Message TUP | Description |
|---|---|---|---|
| 1 | Initial Address Message (IAM) | Initial Address Message (IAM), Initial Address Message with Additional Information (IAI) | Sent to terminating switch to initiate seizure of an outgoing bearer channel. |
| 2 | Initial Address Message (IAM) with Continuity Check Request | Initial Address Message (IAM) with Continuity Check Request | Sent to terminating switch to initiate seizure of an outgoing bearer channel. |
| 3 | Continuity Test Message (COT) with pass indication | Continuity Test Message (COT) with pass indication | Sent to terminating switch to indicate that continuity test passed. |
| 4 | Address Complete Message (ACM) | Address Complete Message (ACM) | Sent to originating switch to indicate that all address signals have been received and that the call set-up is progressing. |
| 5 | Answer Message (ANM) | Answer Signal (ANC, ANN, ANU) | Sent to originating switch to indicate that the called party has answered the call. |
| 6 | Call Proceeding Message (CPG) | | Sent to originating switch to indicate that all address signals have been received and that the call set-up is progressing. |
| 7 | Connect Message (CON) | | Sent to originating switch to indicate that all of the address signals required for routing the call to the called party have been received, and that the call has been answered. |
| 8 | Release Message (REL) | Clear Forward Signal (CLF) | Sent to originating or terminating switch to indicate that the bearer channel identified in the message is being released. |
| 9 | Release Complete Message (RLC) | Clear Backward Signal (CBK) | Sent to originating or terminating switch as a response to a REL or reset circuit (RSC) message to indicate that the circuit has been brought into the idle state. |

TABLE 1-continued

Signaling Events - Call Control

| Signaling Message ID | Signaling Message ISUP | Signaling Message TUP | Description |
|---|---|---|---|
| 10 | Suspend Message (SUS) | | Sent to originating switch to indicate that the called party has been temporarily disconnected (for example, called party has gone on hook during a call's active state). |
| 11 | Resume Message (RES) | | Sent to originating or terminating switch to indicate reconnection after being suspended (for example, the called party has gone off hook within a certain time after going on hook during the call's active state). |

Maintenance messages are used for circuit supervision control for maintenance purposes and for recovery from abnormal situations. SS7 maintenance messages are defined in ITU Q.762 and ITU Q.723. Table 2 displays an exemplary list of maintenance messages the signaling event analyzer block 342 may identify. In alternative embodiments, the signaling event analyzer block 342 may identify a different set or subset of maintenance messages.

In this embodiment, the signaling event analyzer block 342 attempts to assign each signaling message an event ID as shown in column 1 of Table 1 and Table 2. The signaling event analyzer block 342 may also extract the CIC, OPC and DPC from the signaling message, and generate a time stamp indicating when the signaling event message was received relative to other signaling events and bearer events. The signaling event analyzer block 342 creates a signaling tag 352 corre-

TABLE 2

Signaling Events - Maintenance

| Signaling Message ID | Signaling Message ISUP | Signaling Message TUP | Description |
|---|---|---|---|
| 12 | Reset Circuit (RSC) | Reset Circuit (RSC) | Sent when switch does not know the state of a particular circuit and wants to release any call in progress, remove any remotely blocked state, and align states. |
| 13 | Continuity Check Request (CCR) | Continuity Check Request (CCR) | Sent to terminating switch to request a continuity check on the identified circuit. |
| 14 | Loop Around (LPA) | | Sent as a response to a CCR to indicate that the requested loop back has been connected (or transceiver in the case of a 2-wire connection). |
| 15 | Blocking (BLO) | Blocking (BLO) | Sent to terminating switch to block call originations for the specified circuit. |
| 16 | Blocking Acknowledge (BLA) | Blocking Acknowledge (BLA) | Sent in response to a blocking message, indicating that the identified circuit has been blocked to outgoing traffic. |
| 17 | Unblocking (UBL) | Unblocking (UBL) | Sent to cancel the blocked condition of a circuit caused by a previously sent blocking message. |
| 18 | Unblocking Acknowledge (UBA) | Unblocking Acknowledge (UBA) | Sent in response to an unblocking message, indicating that the identified circuit is now unblocked. |
| 19 | Circuit Group Blocking (CGB) | Maintenance/ Hardware Failure Group Blocking Request (MGB/HGB) | Sent to terminating switch to block call originations for a specified group of contiguous circuits. |
| 20 | Circuit Group Blocking Acknowledge (CGBA) | Maintenance/Hardware Failure Group Blocking Acknowledge (MGA/HGA) | Sent in response to a group blocking message, indicating that the identified group of circuits has been blocked to outgoing traffic. |
| 21 | Circuit Group Unblocking (CGU) | Maintenance/ Hardware Failure Group Unblocking Request (MGU/HGU) | Sent to terminating switch to remove the blocked condition for a specified group of circuits, allowing call originations to occur. |
| 22 | Circuit Group Unblocking Acknowledge (CGUA) | Maintenance/ Hardware Failure Group Unblocking Acknowledge (MUA/HUA) | Sent in response to a group unblocking message, indicating that the identified group of circuits is now unblocked. |
| 23 | Circuit Group Reset (CGR) | Circuit Group Reset (GRS) | Sent to align the state of a group of circuits with the state of those circuits as perceived by the exchange after releasing any calls in progress, and after removing any blocked condition from that group of circuits. |
| 24 | Circuit Group Reset Acknowledgement (CGRA) | Circuit Group Reset Acknowledgement (GRA) | Sent in response to a GRS message to indicate that the group of circuits has been realigned. | sponding to the signaling message. The signaling tag 352 may include one or more information fields, for example, the event ID, the CIC, OPC, DPC, and a time stamp. Of course, under alternative embodiments the signaling tag 352 may include a subset of these fields, or may include additional information fields. The information communicated by the signaling tag 352 may be referenced by value, or may be referenced by location, for example, a pointer. The signaling event analyzer block 342 passes the signaling tag 352 to the statistical learning model block 360. Note that the signaling event analyzer block may not associate an event ID with all types of ISUP and TUP signaling messages. In this embodiment, if the signaling event analyzer block 342 associates an event ID with a signaling message, the signaling event analyzer block 342 does not pass any information regarding this signaling message to the statistical learning model block 360.

Bearer Event Analyzer Block

Extracted bearer channels 334 are processed by the bearer event analyzer block 344. The bearer event analyzer block 344 scans the content of each DS0 that is identified as a bearer channel by the DS0 separation block 324. Unlike the signaling event analyzer block 342, which may parse packet headers for specific protocol data fields, the bearer event analyzer block 344 may identify bearer events by analyzing digitized audio signals within bearer channels 334, for example voice traffic or test tones. Table 3 displays an exemplary list of bearer events that may be identified within the bearer channels 334 by the bearer event analyzer block 344. In alternative embodiments, the bearer event analyzer block 344 may identify a different set or subset of bearer events.

TABLE 3

Bearer Events

| ID | Bearer Event | Description |
|---|---|---|
| 1 | Idle code (IC) | When a bearer channel is not in use for voice communication, an idle code is transmitted on it. The idle code is usually represented by A-law PCM code 0xD5 or 0x55 and Mu-law PCM code 0xFF or 0x7F. |
| 2 | Continuity Test (COT) Tones | Because SS7 signaling messages are sent on the physical channel separate from the bearer channel, there is no knowledge of operational status of bearer channel. SS7 provides capability to test the bearer channel before connecting call (voice traffic) to it. Continuity test verifies the physical bearer connection between two SSPs. Continuity testing can be considered as a part of the ISUP maintenance functions. It can be invoked to test trunks manually, as part of routine maintenance and troubleshooting procedures. Continuity test can also be provisioned to take place during normal call setup and it has an impact on the flow of call processing. During call processing, the originating switch determines whether a continuity test should be performed. Network guidelines vary concerning whether and how often continuity testing is performed. Typically, per-call continuity checks may be needed when the transmission link between switches contains a TDMA satellite system, a digital circuit multiplication system or a digital access and cross connection system, where fault indications are lost. The following tones are using in continuity test procedure: 1) 2010 Hz Tone ± 20 Hz (CO1) - Sent from originating switch, and 2) 1780 Hz Tone ± 20 Hz (CO2) - Sent from terminating switch. |
| 3 | Ring-back Tone (RBT) | A Ring-back tone is the audible ringing that is heard by calling party after dialing and prior to the call being answered at the receiving end. This tone assures the calling party that a ringing signal is being sent on the called party's line. A personalized version of RBT is known as Caller Ring-back Tone or Personalized Ring-back Tone. The Ring-back tone is different in various countries depending on the requirements for the ring-back specification in those countries. The recommended frequency for the ringing tone is between 400 and 450 Hz. The accepted frequency should be not less than 340 Hz, or more than 500 Hz. The recommended limits for the tone period (including tolerances) are from 0.67 to 1.5 seconds. The recommended limits for the silent period separating two tone periods are 3 to 5 seconds. See ITU Q.35 for more information. |
| 4 | Busy Tone (BT) | Subscriber Busy tone is audible tone that is heard by calling party that indicates that the called subscriber line is busy. Network/Equipment busy (or congestion) tone is audible tone that is heard by the calling party that indicates that the no transmission path to the called number is available. The recommended frequency for the busy tone and for the congestion tone must be between 400 and 450 Hz. The accepted frequency must not be less than 340 not more than 500 Hz. The total duration of a complete cycle (tone period E + silent period S) should be between 300 and 1100 milliseconds. The ratio E/S of the tone period to the silent period should be between 0.67 and 1.5 (recommended values). See ITU Q.35 for more information. |

TABLE 3-continued

Bearer Events

| ID | Bearer Event | Description |
|---|---|---|
| 5 | Special Information Tone (SIT) | A Special Information Tone (SIT) is three beep signal indicating that the call did not go through and usually precedes a recorded announcement explaining the problem. A SIT, as defined by the ITU - Telecommunications Standardization Sector (ITU-T), consists of a sequence of three precise tone segments with frequencies of 950 ± 50 Hz, 1400 ± 50 Hz, and 1800 ± 50 Hz, sent in that order. Each segment is allowed a duration of 330 ± 70 ms with a silent interval of up to 30 ms between segments. See ITU Q.35 for more information |
| 6 | Communication Traffic (CT) | VOICE/FAX/DATA/Noise/Silence Traffic Signals. |

Under the second embodiment, the bearer event analyzer 344 detects traffic transitions on the bearer channels 334. A traffic transition occurs when the content of a bearer channel 334 changes to a different type of traffic. For example, a traffic transition may occur when a busy tone (BT) ends and an idle code (IC) begins. The bearer event analyzer block 344 creates a bearer tag 354 corresponding to a traffic transition on the bearer channels 334. The bearer tag 354 may include one or more information fields, for example, a bearer channel event ID, an interface number, a time slot number, and a time stamp. Of course, under alternative embodiments the bearer tag 354 may include a subset of these fields, or may include additional information fields. The information communicated by the bearer tag 354 may be referenced by value, or may be referenced by location, for example, a pointer. The bearer event analyzer 344 forwards the bearer tag 354 to the statistical learning model block 360 for further processing.

Statistical Learning Model Block

The statistical learning model block 360 contains a confidence computation logic block 362 and a mapping matrix 364. The confidence computation logic block 362 receives the bearer tags 354 and the signaling tags 352 from the event detection block 340. The confidence computation logic block 362 may receive a bearer tag 354 or a signaling tag 352 and examine the timestamp of the bearer tag 354 or the signaling tag 352. The confidence computation logic block 362 then looks for all bearer tags 354 and signaling tags 352 received within a correlation time window.

The confidence computation logic block 362 identifies a pairing between each bearer tag 354 and each signaling tag 352 found within the correlation time window. The correlation time window size may be user configurable. The confidence computation logic block 362 calculates a confidence value 366, or correlation confidence value, for each pairing within the correlation time window. The correlation confidence value may indicate whether and to what degree a bearer event and a signaling event are correlated. For example, a higher correlation confidence value may indicate a greater likelihood that the bearer event and the signaling event are correlated than a lower correlation confidence value, and a negative correlation confidence value may indicate that the bearer event and the signaling event are not correlated. An exemplary method for calculating the confidence value 366 is described below.

The statistical learning model block 360 assigns each confidence value 366 a row index based upon the pairing signaling tag 352, and a column index based upon the pairing bearer tag 354. The confidence computation logic block 362 then forwards the confidence value 366 for each pairing to the mapping matrix 364. Of course, in other embodiments, the row index may be assigned based on the bearer tag 354, and the column index may be assigned based on the signaling tag 352.

The mapping matrix 364 calculates and accumulates an average correlation confidence value for each successive pairing. The mapping matrix 364 may contain an entry cell for each possible pairing. The mapping matrix 364 uses the row index and column index of the confidence value 366 to locate the entry cell for the pairing. For example, the row index r may be the logical circuit ID, and the column index c may be the bearer channel. Each entry cell may contain an average correlation confidence value, among other data. As each successive confidence value 366 is received, the mapping matrix 364 calculates and accumulates the average correlation confidence value for each pairing. The method for calculating the average correlation confidence value is described below.

Mapping Control

Over time, the average confidence value for a pairing in the mapping matrix 364 may converge, indicating a strong correlation between a bearer channel and a CIC. If the average confidence value exceeds a lock threshold, a mapping control block 390 may lock the pairing associated with the mapping matrix cell containing the average confidence value. Such a locking indicates that the mapping control block 390 has determined that the paired bearer channel and the pairing CIC are associated. Therefore, the mapping control block 390 may instruct DS0 extraction block 322 thereafter not to extract the DS0 associated with the locked pairing timeslot.

Similarly, the mapping control block 390 may instruct the signaling event analyzer block 342 to ignore any signaling events containing the CIC associated with the locked pairing. In addition, the mapping control block 390 may instruct the statistical learning model block 360 thereafter not to process any bearer tag 354 with the column index of the locked mapping matrix cell, and the mapping control block 390 may instruct the statistical learning model block 360 thereafter not to process any signaling tag with the row index of the locked mapping matrix cell. Instructing the statistical learning model block 360 not to process a row or column is called blocking, and may improve the efficiency of mapping bearer channels to CICs by not wasting computational bandwidth processing bearer channels or signaling events that have previously been mapped.

In alternative embodiments, the demultiplexer block 320, the event detection block 340, the statistical learning model block 360, and the mapping control block 390 may be implemented in separate circuit elements, or two or more blocks may be combined within a single circuit element. Functions of these blocks may be performed by dedicated hardware, or may be performed in software modules through configuration of a general purpose processor. Combinations are also possible, for example, the demultiplexer block 320, may be implemented in hardware using an ASIC or FPGA, while the event detection block 340, the statistical learning model block 360, and the mapping control block 390 may be implemented in firmware or software.

Calculating the Confidence Value

The confidence value 366 for a bearing channel event and signaling event pairing may be used to determine whether a signaling event is associated with a paired bearing channel event. Table 4 lists state variables that may be used in confidence computation.

TABLE 4 state variables used in confidence computation

| Variable | Description |
| --- | --- |
| SigState[0 . . . R − 1] | Signaling event Id received by each logical circuit specified by r = {CIC, OPC, DPC}. |
| SigStateNCorr[0 . . . R − 1] | Number of bearer channels correlated for last signaling event received. |
| SigStateTS[0 . . . R − 1] | Time stamp of last signaling event Id received by each logical circuit specified by r = {CIC, OPC, DPC}. |
| MappingMatrixCurConf[0 . . . R − 1, 0 . . . C − 1] | Two-dimensional matrix which maintains current confidence value for each mapping. |
| MappingMatrixCumConf[0 . . . R − 1, 0 . . . C − 1] | Two-dimensional matrix which maintains cumulative confidence value for each mapping. |
| MappingMatrixUpdateCnt[0 . . . R − 1, 0 . . . C − 1] | Two-dimensional matrix which maintains counter value indicating number of times cumulative confidence value for each mapping has been updated. |
| MappingMatrixLock[0 . . . R − 1, 0 . . . C − 1] | Indicates lock state of each mapping. |

Where,
R = Maximum number of logical circuits
C = Maximum number of bearer channels Table 5 lists correlation time windows that may be used in confidence computation.

TABLE 5 variables used in confidence computation

| Variable | Description |
| --- | --- |
| $CTW_{IAM}$ | Correlation Time Window after receiving call control setup messages. |
| $CTW_{COT}$ | Correlation Time Window after receiving continuity check messages. |
| $CTW_{ACM}$ | Correlation Time Window after receiving address complete messages. |
| $CTW_{REL}$ | Correlation Time Window after receiving circuit release/reset messages. |

For example, $CTW_{IAM}$ may define the amount of time after a call control setup message is received that a bearer channel event may be examined for a pairing. If the bearer channel event is detected outside the correlation time window, the signaling event and the bearer channel event may not be examined for pairing.

An example implementation setting state variables to initial values is as follows:

```
Initial Conditions:
    for r = 0.. R−1
        SigState[r] = 0
        SigStateTS[r] = 0
        for c = 0.. C−1
            MappingMatrixCurConf[r,c] = 0.0
            MappingMatrixCumConf[r,c] = 0.0
            MappingMatrixUpdateCnt[r,c] = 0
        end
    end
```

When a signaling or bearer event is detected, it is processed. The processing for bearer events and signaling events is performed separately, but both may reference shared data, for example, a common mapping matrix. The bearer event processing is described below, followed by the signaling event processing. As each new event is processed, the correlation confidence value between a bearer channel and a CIC may converge, with a high correlation confidence value indicating that the bearer channel and CIC may be associated, and a low or negative correlation confidence value indicating the bearer channel and CIC may not be associated.

Figure 4A:
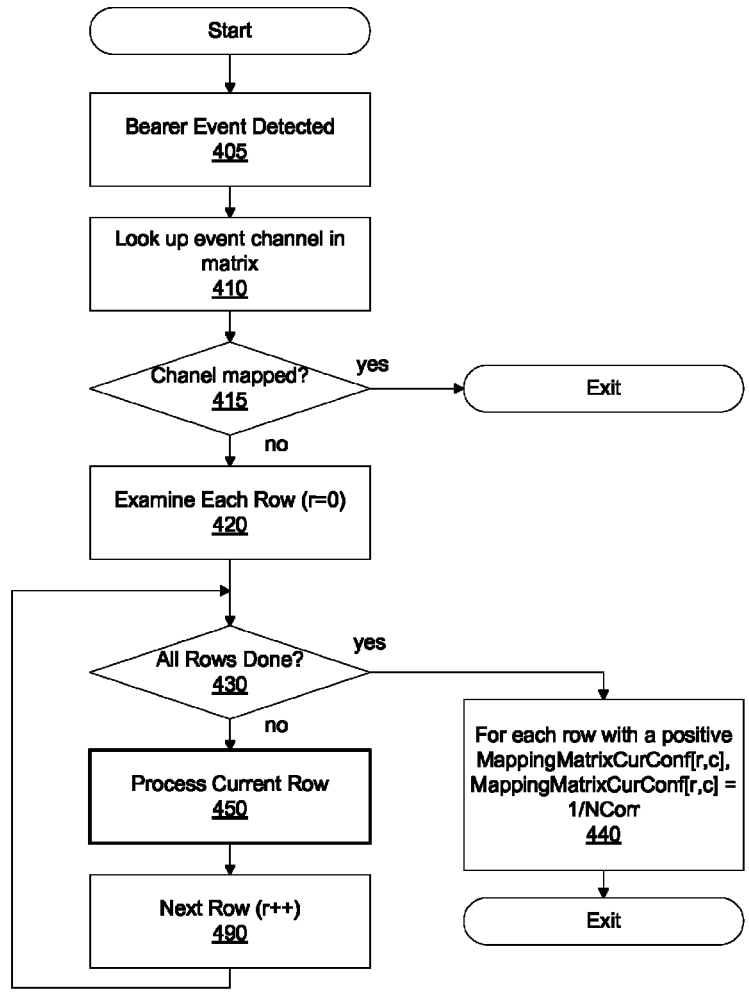
FIG. 4A is a flow diagram of an exemplary embodiment of bearer event processing logic.

When a bearer event is detected, the bearer event may be processed through bearer event processing logic. FIG. 4A is a flow diagram of an exemplary embodiment of a method for processing bearer channel events. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A bearer event is detected, as shown by block 405. An event row in the mapping matrix may be referenced based upon the bearer event circuit ID, as shown by block 410. If the mapping matrix is locked for bearer channel corresponding to the bearer event, the process exits (block 415). Otherwise, each mapping matrix row, corresponding to a logical circuit ID, is examined in turn, starting with a row index r=0 (block 420). Each logical circuit ID is processed, as shown by block 450, and the row index is incremented (block 490). The row index is checked to ensure all logical circuit IDs have been processed, as shown by block 430.

Figure 4B:
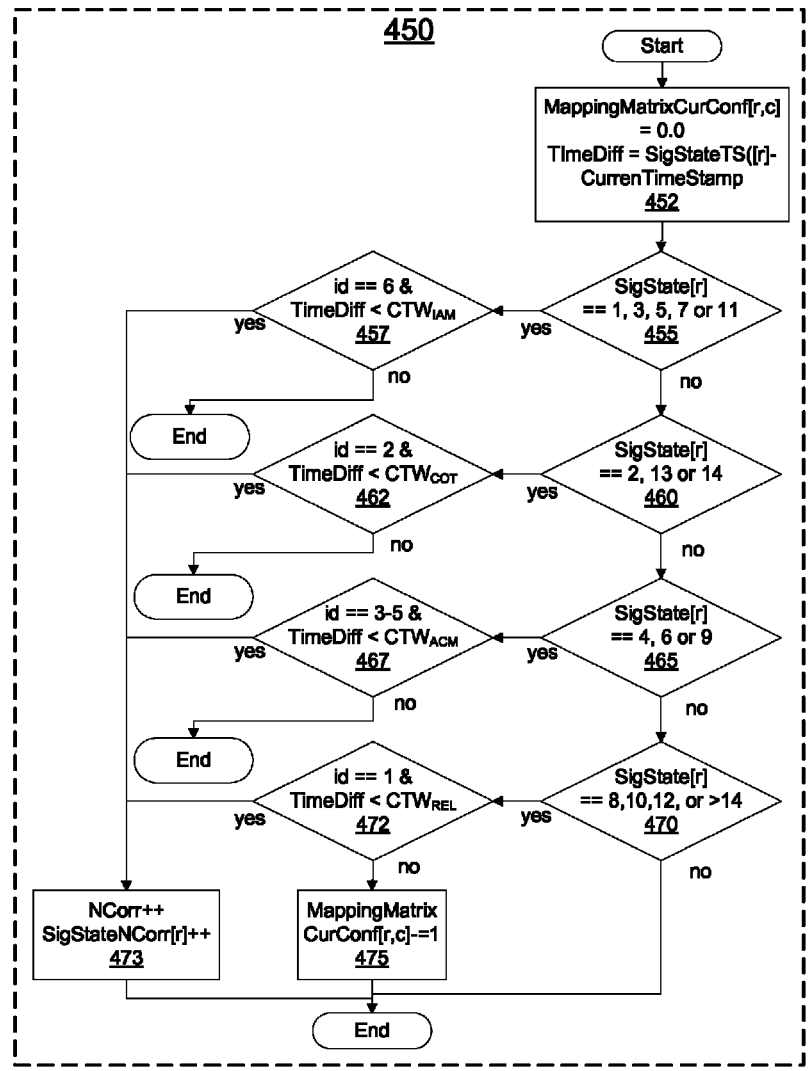
FIG. 4B is a flow diagram detail showing an example of bearer event processing logic.

The logical circuit processing of block 450 is shown in detail by the flowchart in FIG. 4B. For each logical circuit ID, corresponding to row index r, the difference in time (TimeDiff) between the bearer event and the most recent signaling event for the current logical circuit ID is calculated, and the current confidence value is cleared, as shown by block 452.

The signaling event ID for the logical circuit r (SigState[r]) is used to determine subsequent processing (blocks 455, 460, 465, and 470). In general, the most recent signaling event ID received by the logical circuit specified by r (SigState[r]) is referenced in the matrix. A time window corresponding to the signaling event ID is referenced to determine whether the lapse in time between the bearer event and the signaling event falls within the time window, that is, if the TimeDiff is less than the time window value (blocks 457, 462, 467, and 472). If the time between the bearer event and the signaling event corresponding to the current row is within the time window, the variable storing the number of correlations for the row (Norr) and the number of correlations for the current bearer event (SigStateNcorr[r]) are updated (block 473). In most circumstances, this update involves incrementing the current correlation count and incrementing the row confidence value. However, in some circumstances, the occurrence of the bearer event and the signaling event within the time window may indicate that the bearer event and the signaling event are unrelated, for example, in a case where the signaling event is a BLO and the bearer event is a COT. If the bearer event and the signaling event are found to be unrelated, the current confidence value for the matrix cell having the current row index and column index is set to negative one (block 475). For example, a negative current confidence value may be used to rule out a bearer channel and CIC association.

If the signaling event ID is 1, 3, 5, 7 or 11, as shown by block 455, processing proceeds to block 457. If the bearer event id=6 (CT), and the TimeDiff is within the correlation time window after receiving call control setup messages ($CTW_{IAM}$), as shown by block 457, NCorr and SigStateNCorr[r] are incremented (block 473).

If the signaling event ID is 2, 13, or 14, as shown by block 460, processing proceeds to block 462. If the bearer event id=2, and the TimeDiff is within the correlation time window after receiving continuity check messages ($CTW_{COT}$), as shown by block 462, NCorr and SigStateNCorr[r] are incremented (block 473).

If the signaling event ID is 4, 6, or 9, as shown by block 465, processing proceeds to block 467. If the bearer event id=3, 4, or 5, and the TimeDiff is within the correlation time window after receiving an address complete message ($CTW_{ACM}$), as shown by block 467, NCorr and SigStateNCorr[r] are incremented (block 473).

If the signaling event ID is 8, 10, or 12, or the signaling event ID is greater than 14, as shown by block 470, processing proceeds to block 472. If the bearer event id=1, and the TimeDiff is within the correlation time window after receiving a circuit release/reset message ($CTW_{REL}$), as shown by block 472, NCorr and SigStateNCorr[r] are incremented (block 473), otherwise, MappingMatrixCurConf[r,c] is set to −1, as shown by block 475.

The Correlation Time Window (CTW) values are used to determine whether a subsequent event is likely to correlate with a previous event. If a subsequent event occurs after the CTW has expired, the subsequent event is considered unlikely to be related to the previous event. It should be noted that a CTW may be a predetermined value, or may be adjusted during processing. As shown by block 440 (FIG. 4A), for each row with a positive MappingMatrixCurConf[r,c], MappingMatrixCurConf[r,c] is set to the inverse of the current correlation count.

Figure 5:
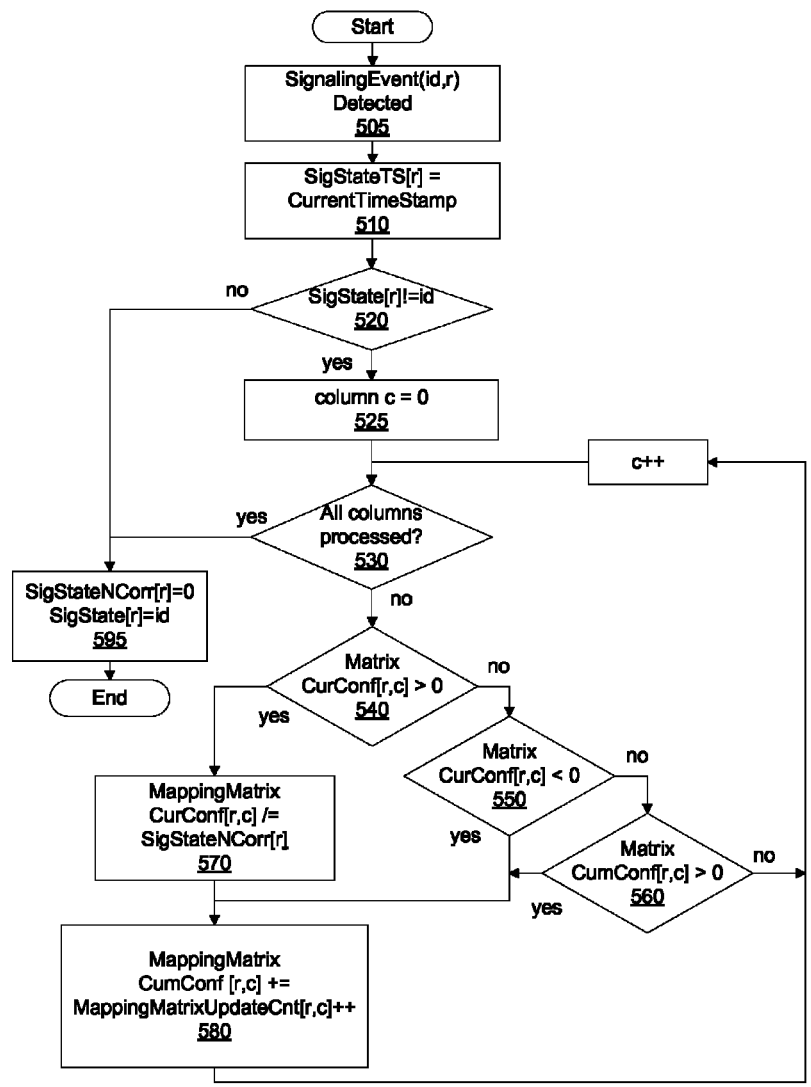
FIG. 5 is a flow diagram of an exemplary embodiment of a method for a signaling event.

When a signaling event is detected, it is processed with signaling event processing logic. FIG. 5 is a flow diagram of an embodiment of the signaling event processing logic. When a circuit group signaling event (CGB, CGBA, CGU, CGUA, CGR and CGRA) is detected, as shown by block 505, each logical circuit ID specified in the message is individually processed.

The event ID is used to determine the matrix row. This event ID may be a logical circuit ID and may be formed using at least one of several fields in the signaling event, for example, the CIC, the OPC and the DPC. The timestamp for the row (SigStateTS) may be updated with the time the signaling event was detected, as shown by block 510, and each mapping matrix column is examined in turn (block 525). If the current confidence value for the row and column (MappingMatrixCurConf[r,c]) is greater than zero (block 540), MappingMatrixCurConf[r,c] is scaled by the number of bearer channels correlated for the last signaling event received (SigStateNCorr[r]) (block 570), and the cumulative confidence value for the row and column (MappingMatrixCumConf[r,c]) is accumulated (block 580). If the current confidence value for the column is less than zero (block 550), the cumulative confidence value for the row and column (MappingMatrixCumConf[r,c]) is accumulated without scaling the current confidence value (block 580). If the current confidence value for the column is zero, and the cumulative confidence value is greater than zero (block 560), the cumulative confidence value for the row and column (MappingMatrixCumConf[r,c]) is accumulated without scaling the current confidence value (block 580). After all the columns have been processed, SigStateNcorr is cleared, and the signal state for the logical circuit, SigState[r], is updated to the signaling event ID (block 595), thereby indicating the most recent signaling event associated with that logical circuit.

Calculating the Average Correlation Confidence Value

The average value of correlation confidence can be computed, for example, by dividing the cumulative confidence value for each mapping matrix cell by the number of times that cell has been updated. An example of the formula for calculating the average value of correlation confidence is shown by MappingMatrixAvgConf[r,c]=MappingMatrixCumConf[r,c]/MappingMatrixUpdateCnt[r,c]  (Eq. 1)

The correlation confidence value for a matrix cell may be used to indicate whether a logical circuit is associated with a bearer channel. As associations between logical circuit and bearing channel pairs are made, they may be removed from the analysis of future events, thereby simplifying the analysis for as-yet unpaired channels and circuits.

In summary, embodiments for a system and method for mapping SS7 bearer channels within a PSTN have been described. It will be apparent to those skilled in the art that various modifications and variations can be made to the structure of the present invention without departing from the scope or spirit of the invention. For example, rather than using a constant for the current confidence value, the current confidence value may be variable. In such an example, the confidence value may be higher based upon the specific pairing of signaling event and bearer channel event, or may change based upon the amount of time measured between the signaling event and bearer channel event. While the presented embodiments describe channels selected from time slots in a time division multiplexed communication system, there is no limitation from extracting channels from frequency slots in frequency division multiplexed systems, or from extracting signaling events or bearer channels from statistical multiplexed communication systems, or from other multiplexing schemes. In other embodiments, the mapping matrix for current and accumulated confidence values may be combined within a single data structure. In view of the foregoing, it is intended that the present invention cover modifications and variations of this invention provided they fall within the scope of the following claims and their equivalents.

What is claimed is:

1. A system, comprising:
an event detector configured to
receive an SS7 signaling message on an SS7 signaling link;
parse a logical circuit from said SS7 signaling message;
receive an SS7 bearer channel; and
detect a bearer channel event on said SS7 bearer channel; and
a statistical learning model block configured to calculate a correlation confidence value between said bearer channel and said logical circuit.

2. The system of claim 1, wherein said SS7 signaling message is an ISUP message.

3. The system of claim 1, wherein said SS7 signaling message is a TUP message.

4. The system of claim 1, wherein said event detector is further configured to:
assign a signaling tag to said signaling event, said signaling tag comprising a signaling event ID, a logical circuit ID and a time stamp; and
assign a bearer tag to a bearer channel event, and said bearer tag comprising a bearer channel event ID, and a time stamp.

5. The system of claim 1, further comprising a demultiplexer configured to extract said SS7 signaling link from a data stream, and to extract said SS7 bearer channel from said data stream.

6. The system of claim 5, wherein said data stream is selected from a group consisting of a DS1, and an E1.

7. The system of claim 5, wherein said data stream is selected from a group consisting of a DS3, an E3, an STM-0, an STS-1, an STM-1, an STS-3, an STM-4, an STS-12, an STS-24, an STS-48, an STM-16, an STS-192, an STM-64, an STS-768, and an STM-246.

8. The system of claim 5, further comprising a mapping control block configured to:
lock a pairing between a bearer channel and a logical circuit;
instruct said demultiplexer not to extract said bearer channel;
instruct said event detector to ignore any signaling events associated with said logical circuit;
instruct said statistical learning model block not to process a bearer tag associated with said bearer channel; and
instruct the statistical learning model block not to process a signaling tag associated with said logical circuit.

9. The system of claim 4, wherein said statistical learning model block comprises:
a confidence computation logic block configured to correlate a pair comprising a bearer channel and a logical circuit; and
a mapping matrix configured to accumulate a running average correlation confidence value for said pair.

10. A method for associating an SS7 logical signaling circuit with an SS7 bearer channel, comprising the steps of:
parsing a logical circuit ID from a signaling message on a SS7 signaling link;
identifying a bearer channel associated with a bearer event on a bearer circuit; and
calculating a current correlation confidence value between said logical circuit ID and said bearer channel.

11. The method of claim 10, further comprising the step of associating said bearer channel with said logical circuit ID.

12. The method of claim 10, further comprising the steps of:
assigning a signaling message event tag to said signaling message; and
assigning a bearer event tag to said bearer event.

13. The method of claim 12, wherein said signaling message event tag further comprises said logical circuit ID.

14. The method of claim 12, wherein said bearer event tag further comprises said bearer channel.

15. The method of claim 10, further comprising the steps of:
reading a stored cumulative correlation confidence value;
calculating an updated cumulative correlation confidence value from said current correlation confidence value and said stored cumulative correlation confidence value; and
storing said updated cumulative correlation confidence value as said stored cumulative correlation confidence value.

16. The method of claim 15, wherein said storing further comprises storing said updated cumulative correlation confidence value within a cumulative confidence table.

17. The method of claim 16, wherein said cumulative confidence table further comprises:
a first confidence table index incorporating said logical circuit ID; and
a second confidence table index incorporating said bearer channel.

18. The method of claim 17, further comprising the steps of:
setting a correlation value lock threshold;
comparing said updated cumulative confidence value to said correlation value lock threshold; and
if said updated cumulative confidence value exceeds said correlation value lock threshold, setting a bearer channel lock indicator.

19. The method of claim 18, further comprising the steps of:
accessing said bearer channel lock indicator; and
if said logical circuit ID lock indicator entry is set, blocking calculation of said current correlation confidence value.

20. The method of claim 18, further comprising the step of storing said bearer channel lock indicator in a lock table, wherein a first lock table index incorporates said bearer channel, and a second lock table index incorporates said logical circuit ID.

21. Non-transitory computer readable media configured to associate an SS7 logical signaling circuit with an SS7 bearer channel, comprising the steps of:
parsing a logical circuit ID from a signaling message on an SS7 signal link;
identifying a bearer channel associated with a bearer event on a bearer circuit; and
calculating a current correlation confidence value between said logical circuit ID and said bearer channel.

22. The computer readable media of claim 21, further comprising the steps of:
reading a stored cumulative correlation confidence value;
calculating an updated cumulative correlation confidence value from said current correlation confidence value and said stored cumulative correlation confidence value; and
storing said updated cumulative correlation confidence value as said stored cumulative correlation confidence value.

23. The method of claim 22 further comprising the steps of:
setting a correlation value threshold;
comparing said updated cumulative confidence value to said correlation value threshold; and
if said updated cumulative confidence value exceeds said correlation value threshold, associating said bearer channel with said logical circuit ID.

24. An apparatus for correlating SS7 signaling circuits with SS7 bearer channels, comprising:
a demultiplexer configured to extract an SS7 signaling link from a data stream, and to extract an SS7 bearer channel from said data stream;
an event detector configured to receive said SS7 signaling link from said demultiplexer, and to parse a signaling message from said SS7 signaling link, the event detector further configured to receive said SS7 bearer channel from said demultiplexer and detect a bearer channel event from said SS7 bearer channel; and
a statistical learning model block configured to calculate a correlation confidence value between said bearer channel event and said signaling message.

* * * * *